United States Patent
Ganapathy et al.

(10) Patent No.: US 10,601,693 B2
(45) Date of Patent: Mar. 24, 2020

(54) SYSTEM AND METHOD FOR PROVIDING SCALABLE FLOW MONITORING IN A DATA CENTER FABRIC

(71) Applicant: Cisco Technology, Inc., San Jose, CA (US)

(72) Inventors: Sivakumar Ganapathy, Fremont, CA (US); Rajagopalan Janakiraman, Cupertino, CA (US); Kalyan Ghosh, Saratoga, CA (US); Sapan Shah, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 147 days.

(21) Appl. No.: 15/658,215

(22) Filed: Jul. 24, 2017

(65) Prior Publication Data

US 2019/0028376 A1 Jan. 24, 2019

(51) Int. Cl.
*H04L 12/26* (2006.01)
*H04L 29/12* (2006.01)
(Continued)

(52) U.S. Cl.
CPC .......... *H04L 43/12* (2013.01); *H04L 12/4679* (2013.01); *H04L 43/026* (2013.01);
(Continued)

(58) Field of Classification Search
CPC ....... H04L 43/12; H04L 43/04; H04L 43/026; H04L 45/7453; H04L 61/2069;
(Continued)

(56) References Cited

U.S. PATENT DOCUMENTS 5,812,773 A 9/1998 Norin
5,889,896 A 3/1999 Meshinsky et al.
(Continued)

FOREIGN PATENT DOCUMENTS

CN 101719930 6/2010
CN 101394360 7/2011
(Continued)

OTHER PUBLICATIONS

Amedro, Brian, et al., "An Efficient Framework for Running Applications on Clusters, Grids and Cloud," 2010, 17 pages.
(Continued)

*Primary Examiner* — Hoang-Chuong Q Vu
(74) *Attorney, Agent, or Firm* — Polsinelli PC

(57) ABSTRACT

Disclosed is a method that includes calculating, at a collector receiving a data flow and via a hashing algorithm, all possible hashes associated with at least one virtual attribute associated with the data flow to yield resultant hash values. Based on the resultant hash values, the method includes computing a multicast address group and multicasting the data flow to n leafs based on the multicast address group. At respective other collectors, the method includes filtering received sub-flows of the data flow based on the resultant hashes, wherein if a respective hash is owned by a collector, the respective collector accepts and saves the sub-flow in a local switch collector database. A scalable, distributed netflow is possible with the ability to respond to queries for fabric-level netflow statistics even on virtual constructs.

20 Claims, 6 Drawing Sheets

(51) Int. Cl.
*H04L 12/46* (2006.01)
*H04L 12/743* (2013.01)

(52) U.S. Cl.
CPC .......... *H04L 43/04* (2013.01); *H04L 45/7453* (2013.01); *H04L 61/2069* (2013.01)

(58) Field of Classification Search
CPC . H04L 12/4679; H04L 29/0653; H04L 49/00; H04L 69/22; H04L 43/045; H04L 45/745; H04L 12/4641
See application file for complete search history.

(56) References Cited

U.S. PATENT DOCUMENTS

| | | | |
|---|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,356,866 B1 * | 5/2016 | Sivaramakrishnan ....................... H04L 45/7453 |
| 9,361,192 B2 | 6/2016 | Smith et al. |
| 9,379,982 B1 * | 6/2016 | Krishna ................ H04L 47/125 |
| 9,380,075 B2 | 6/2016 | He et al. |
| 9,397,946 B1 * | 7/2016 | Yadav ................. H04L 41/0806 |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |

(56) References Cited

U.S. PATENT DOCUMENTS

| | | |
|---|---|---|
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0031294 A1* | 1/2013 | Feng .......... G06F 9/06 711/6 |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |

(56) References Cited

U.S. PATENT DOCUMENTS

| | | |
|---|---|---|
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1* | 10/2014 | Cafarelli ............ H04L 47/2441 370/235 |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0244617 A1 | 8/2015 | Nakil et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0359872 A1* | 12/2016 | Yadav ...................... H04L 43/04 |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0126566 A1* | 5/2017 | Wang .................. H04L 61/2592 |
| 2017/0126567 A1* | 5/2017 | Wang .................. H04L 45/7453 |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |
| 2018/0109606 A1* | 4/2018 | Alpert ...................... H04L 45/02 |
| 2018/0367364 A1* | 12/2018 | Johansson ............ H04L 41/0213 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |

(56) References Cited

FOREIGN PATENT DOCUMENTS

| WO | WO 2010/030915 | 3/2010 |
|---|---|---|
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding For NSH," Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.

(56) References Cited

OTHER PUBLICATIONS

Open Stack, "Filter Scheduler," updated Dec. 17, 2017, 5 pages, accessed on Dec. 18, 2017, https://docs.openstack.org/nova/latest/user/filter-scheduler.html.

Quinn, P., et al., "Network Service Header," Internet Engineering Task Force Draft, Jul. 3, 2014, 27 pages.

Quinn, P., et al., "Service Function Chaining (SFC) Architecture," Network Working Group, Internet Draft, draft-quinn-sfc-arch-03.txt, Jan. 22, 2014, 21 pages.

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Ye, Xianglong, et al., "A Novel Blocks Placement Strategy for Hadoop," 2012 IEEE/ACTS 11th International Conference on Computer and Information Science, 2012 IEEE, 5 pages.

Invitation to Pay Additional Fees and, Where Applicable, Protest Fee, with Partial Search Report, from the International Searching Authority, dated Oct. 5, 2018, 10 pages, for the corresponding International Application PCT/US2018/043400.

Kemper, Alfons, et al., "HyperQueries: Dynamic Distributed Query Processing on the Internet," Proceedings of the 27th VLDB Conference, Sep. 14, 2001, 10 pages, Rome, Italy.

\* cited by examiner

SYSTEM AND METHOD FOR PROVIDING SCALABLE FLOW MONITORING IN A DATA CENTER FABRIC

TECHNICAL FIELD

The disclosure provides a method of creating a virtual netflow collector in which netflow packet collection is distributed across switches in an Application Centric Infrastructure fabric, a hash combination is calculated for packet subflows and the hash combination is mapped to an IP multicast address for mapping to a physical netflow collector.

BACKGROUND

Today, netflow data collection is on a per node, per interface basis and is configured and managed for individual switches. The current approach has the following limitations. First, it is very difficult to correlate common (such as Tenant, Context (virtual routing and forwarding or VRF), Bridge Domains (BD)) and granular statistics (Application stats) across a network of switches, unless all the flow statistics go to the same collector. In a typical Application Centric Infrastructure (ACI) deployment, collecting fabric-level netflow statistics on virtual constructs such as the Tenant, VRF or BD is difficult, as the flows for these higher-level constructs will be spread across multiple switches in the fabric and these switches may be using different collectors for bandwidth scaling. Also, in a controller managed datacenter fabric, it is desired to collect finer statistics at various scopes than a traditional network. For instance, an administrator might want to collect statistics of a particular application for a tenant and multiple instances of this application can be running attached to different switches in the fabric. In general, fabric-wide granular netflow support will help provide meaningful information of application flows in the world of ACI.

Another limitation is the scalability and the management of the netflow collectors which cater to these set of the switches. In the current method, a flow collector is statically mapped to a netflow monitoring entity such as an interface on a switch. This method cannot scale when the bandwidth needs are different across different interfaces or switches. Also, when there are more collectors/switches, it becomes too difficult to manage the collector configuration. In a Dynamic Virtual Machine (VM) management environment, a collector should be able to cater to the VM moves. The same collector has to be provisioned across the entire domain where the VM could move.

As ACI ventures into cloud deployments, the requirement for an efficient netflow solution is even more compelling, as the fabric will be extended to support higher scale of virtual leaf switches and virtual PODs in the cloud. In this environment, managing netflow collectors per virtual leaf and maintaining a large number of collectors will be difficult.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
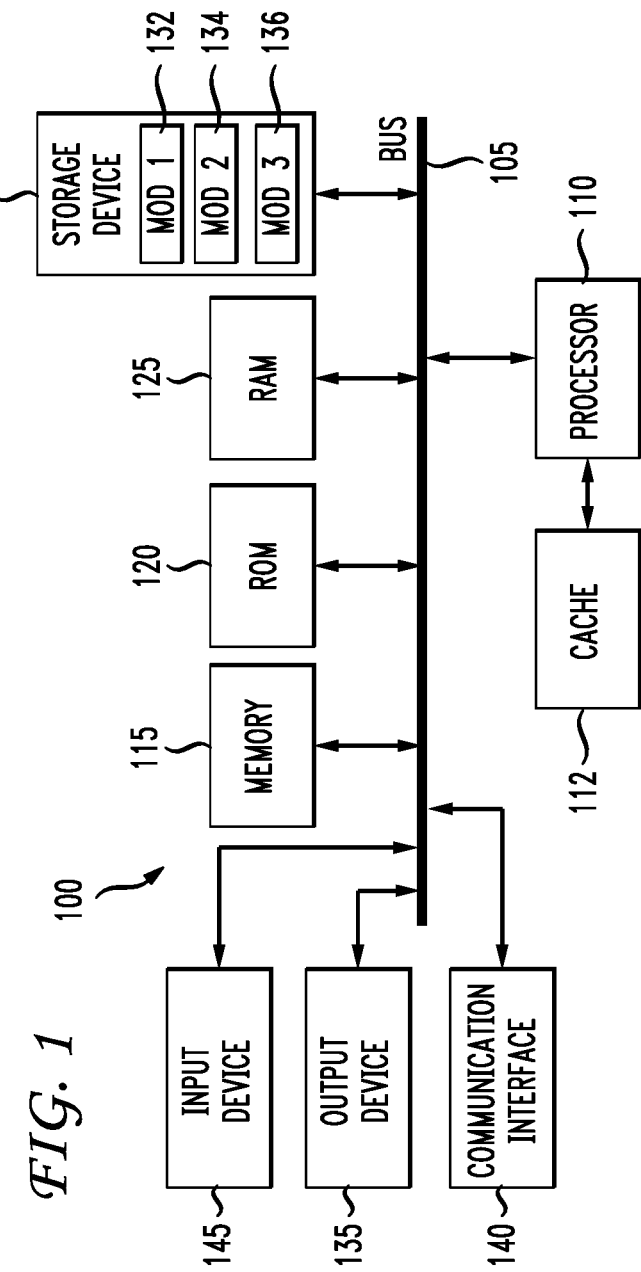
FIG. 1 illustrates an example system configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A method aspect of this disclosure includes distributing netflow packet collectors across all switched in a network fabric of switches to yield a virtual netflow collector, calculating a first hash at a source switch of an incoming packet on each possible combination of a 5-tuple IP packet header, calculating a second hash at the source switch of an incoming packet on each possible combination of at least one virtual attribute of the network fabric of switches, creating an N-Tuple flow from the first hash and the second hash, exporting the N-Tuple flow to the virtual netflow collector and mapping, via a virtual extensible local area network multicast address group, the virtual netflow collector to one or more physical netflow collector.

Another method aspect includes calculating, at a collector receiving a data flow and via a hashing algorithm, all possible hashes associated with at least one virtual attribute associated with the data flow to yield resultant hash values, and, based on the resultant hash values, computing a multicast address group and multicasting the data flow to n leafs based on the multicast address group. The method includes, at respective other collectors, filtering received sub-flows of the data flow based on the resultant hashes, wherein if a respective collector is owned by a hash, the respective collector accepts and saves the sub-flow in a local switch collector database. The method also can include receiving a query using the hashing algorithm to query a relevant aggregated or granular flow.

DETAILED DESCRIPTION

The present disclosure addresses the issues raised above. The disclosure provides a system, method and computer-readable storage device embodiments. The concepts disclosed herein address the monitoring requirements for a high scale datacenter fabric environment. The concepts include correlating common attributes across a network of switches, providing a granular view of statistics which makes any form of visualization and projection easy, providing a scalable collection mechanism which can elastically handle additional nodes and bandwidth, and placing a collector that is decoupled from the monitoring entity, which helps dynamically migrating the collector to any node without having to change anything in the monitoring entity. These features allow the netflow collection to be placed through any workload orchestration, making better use of distributed compute resources.

First a general example system shall be disclosed in FIG. 1 which can provide some basic hardware components making up a server, node or other computer system. FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different performance characteristics. The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may essentially be a completely self-contained computing system, containing multiple cores or processors, a bus (connector), memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

Figure 2:
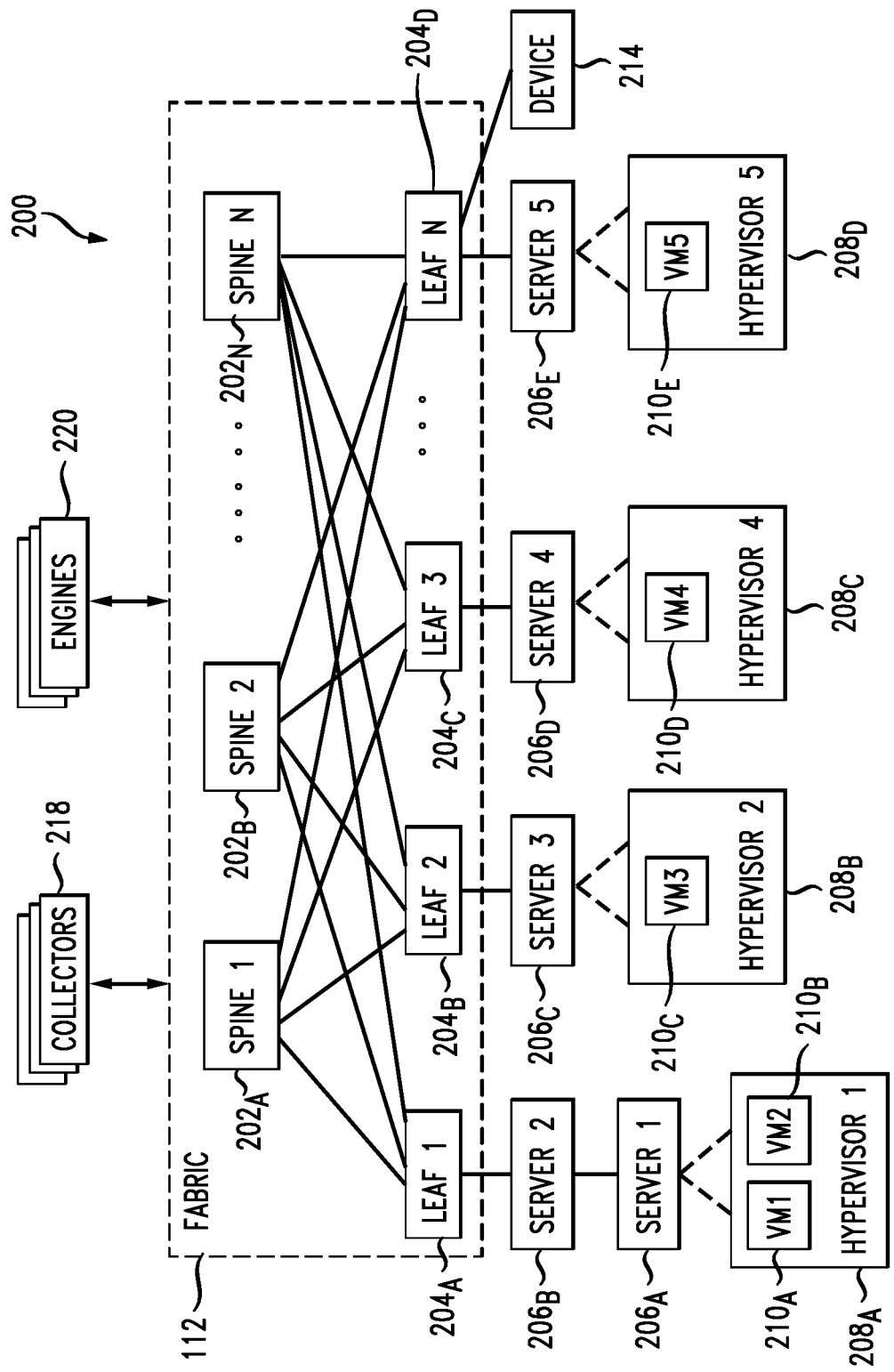
FIG. 2 illustrates an example network environment.

Having introduced the basic computing components which can be applicable to embodiments associated with this disclosure, the disclosure now turn to FIG. 2 which illustrates an example network environment.

FIG. 2 illustrates a diagram of example network environment 200. This figure is discussed with the concept of capturing agents on various network components. It is noted that the disclosed concept discussed below with respect to FIG. 4, and the focus of this disclosure, differs in how collection is done from what is referenced in FIG. 2. With reference to FIG. 2, fabric 212 can represent the underlay (i.e., physical network) of network environment 200. Fabric 212 can include spine routers 1-N ($202_{A-N}$) (collectively "202") and leaf routers 1-N ($204_{A-N}$) (collectively "204"). Leaf routers 204 can reside at the edge of fabric 212, and can thus represent the physical network edges. Leaf routers 204 can be, for example, top-of-rack ("ToR") switches, aggregation switches, gateways, ingress and/or egress switches, provider edge devices, and/or any other type of routing or switching device.

Leaf routers 204 can be responsible for routing and/or bridging tenant or endpoint packets and applying network policies. Spine routers 202 can perform switching and routing within fabric 212. Thus, network connectivity in fabric 212 can flow from spine routers 202 to leaf routers 204, and vice versa.

Leaf routers 204 can provide servers 1-5 ($206_{A-E}$) (collectively "206"), hypervisors 1-4 ($208_A$-$208_D$) (collectively "208"), and virtual machines (VMs) 1-5 ($210_A$-$210_E$) (collectively "210") access to fabric 212. For example, leaf routers 204 can encapsulate and decapsulate packets to and from servers 206 in order to enable communications throughout environment 200. Leaf routers 204 can also connect other devices, such as device 214, with fabric 212. Device 214 can be any network-capable device(s) or network(s), such as a firewall, a database, a server, a collector 218 (further described below), an engine 220 (further described below), etc. Leaf routers 204 can also provide any other servers, resources, endpoints, external networks, VMs, services, tenants, or workloads with access to fabric 212.

VMs 210 can be virtual machines hosted by hypervisors 208 running on servers 206. VMs 210 can include workloads running on a guest operating system on a respective server. Hypervisors 208 can provide a layer of software, firmware, and/or hardware that creates and runs the VMs 210. Hypervisors 208 can allow VMs 210 to share hardware resources on servers 206, and the hardware resources on servers 206 to appear as multiple, separate hardware platforms. Moreover, hypervisors 208 and servers 206 can host one or more VMs 210. For example, server $206_A$ and hypervisor $208_A$ can host VMs $210_{A-B}$.

In some cases, VMs 210 and/or hypervisors 208 can be migrated to other servers 206. For example, VM $210_A$ can be migrated to server $206_C$ and hypervisor $208_B$. Servers 206 can similarly be migrated to other locations in network environment 200. A server connected to a specific leaf router can be changed to connect to a different or additional leaf router. In some cases, some or all of servers 206, hypervisors 208, and/or VMs 210 can represent tenant space. Tenant space can include workloads, services, applications, devices, and/or resources that are associated with one or more clients or subscribers. Accordingly, traffic in network environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Any of leaf routers 204, servers 206, hypervisors 208, and VMs 210 can include a capturing agent (also referred to as a "sensor") configured to capture network data, and report any portion of the captured data to collector 218. Capturing agents 216 can be processes, agents, modules, drivers, or components deployed on a respective system (e.g., a server, VM, hypervisor, leaf router, etc.), configured to capture network data for the respective system (e.g., data received or transmitted by the respective system), and report some or all of the captured data to collector 218.

For example, a VM capturing agent can run as a process, kernel module, or kernel driver on the guest operating system installed in a VM and configured to capture data (e.g., network and/or system data) processed (e.g., sent, received, generated, etc.) by the VM. Additionally, a hypervisor capturing agent can run as a process, kernel module, or kernel driver on the host operating system installed at the hypervisor layer and configured to capture data (e.g., network and/or system data) processed (e.g., sent, received, generated, etc.) by the hypervisor. A server capturing agent can run as a process, kernel module, or kernel driver on the host operating system of a server and configured to capture data (e.g., network and/or system data) processed (e.g., sent, received, generated, etc.) by the server. And a network device capturing agent can run as a process or component in a network device, such as leaf routers 204, and configured to capture data (e.g., network and/or system data) processed (e.g., sent, received, generated, etc.) by the network device.

Capturing agents or sensors can be configured to report the observed data and/or metadata about one or more packets, flows, communications, processes, events, and/or activities to collector 218. For example, capturing agents can capture network data as well as information about the system or host of the capturing agents (e.g., where the capturing agents are deployed). Such information can also include, for example, data or metadata of active or previously active processes of the system, operating system user identifiers, metadata of files on the system, system alerts, networking information, etc. Capturing agents may also analyze all the processes running on the respective VMs, hypervisors, servers, or network devices to determine specifically which process is responsible for a particular flow of network traffic. Similarly, capturing agents may determine which operating system user(s) is responsible for a given flow. Reported data from capturing agents can provide details or statistics particular to one or more tenants. For example, reported data from a subset of capturing agents deployed throughout devices or elements in a tenant space can provide information about the performance, use, quality, events, processes, security status, characteristics, statistics, patterns, conditions, configurations, topology, and/or any other information for the particular tenant space.

Collectors 218 can be one or more devices, modules, workloads and/or processes capable of receiving data from capturing agents. Collectors 218 can thus collect reports and data from capturing agents. Collectors 218 can be deployed anywhere in network environment 200 and/or even on remote networks capable of communicating with network environment 200. For example, one or more collectors can be deployed within fabric 212 or on one or more of the servers 206. One or more collectors can be deployed outside of fabric 212 but connected to one or more leaf routers 204. Collectors 218 can be part of servers 206 and/or separate servers or devices (e.g., device 214). Collectors 218 can also be implemented in a cluster of servers.

Collectors 218 can be configured to collect data from capturing agents. In addition, collectors 218 can be implemented in one or more servers in a distributed fashion. As previously noted, collectors 218 can include one or more collectors. Moreover, each collector can be configured to receive reported data from all capturing agents or a subset of capturing agents. For example, a collector can be assigned to a subset of capturing agents so the data received by that specific collector is limited to data from the subset of capturing agents.

Collectors 218 can be configured to aggregate data from all capturing agents and/or a subset of capturing agents. Moreover, collectors 218 can be configured to analyze some or all of the data reported by capturing agents. For example, collectors 218 can include analytics engines (e.g., engines 220) for analyzing collected data. Environment 200 can also include separate analytics engines 220 configured to analyze the data reported to collectors 218. For example, engines 220 can be configured to receive collected data from collectors 218 and aggregate the data, analyze the data (individually and/or aggregated), generate reports, identify conditions, compute statistics, visualize reported data, present visualized data, troubleshoot conditions, visualize the network and/or portions of the network (e.g., a tenant space), generate alerts, identify patterns, calculate misconfigurations, identify errors, generate suggestions, generate testing, and/or perform any other analytics functions.

While collectors 218 and engines 220 are shown as separate entities, this is for illustration purposes as other configurations are also contemplated herein. For example, any of collectors 218 and engines 220 can be part of a same or separate entity. Moreover, any of the collector, aggregation, and analytics functions can be implemented by one entity (e.g., collectors 218) or separately implemented by multiple entities (e.g., engine 220 and/or collectors 218).

Each of the capturing agents can use a respective address (e.g., internet protocol (IP) address, port number, etc.) of their host to send information to collectors 218 and/or any other destination. Collectors 218 may also be associated with their respective addresses such as IP addresses. Moreover, capturing agents can periodically send information about flows they observe to collectors 218. Capturing agents can be configured to report each and every flow they observe. Capturing agents can report a list of flows that were active during a period of time (e.g., between the current time and the time of the last report). The consecutive periods of time of observance can be represented as pre-defined or adjustable time series. The series can be adjusted to a specific level of granularity. Thus, the time periods can be adjusted to control the level of details in statistics and can be customized based on specific requirements, such as security, scalability, storage, etc. The time series information can also be implemented to focus on more important flows or components (e.g., VMs) by varying the time intervals. The communication channel between a capturing agent and collector 218 can also create a flow in every reporting interval. Thus, the information transmitted or reported by capturing agents can also include information about the flow created by the communication channel.

Figure 3:
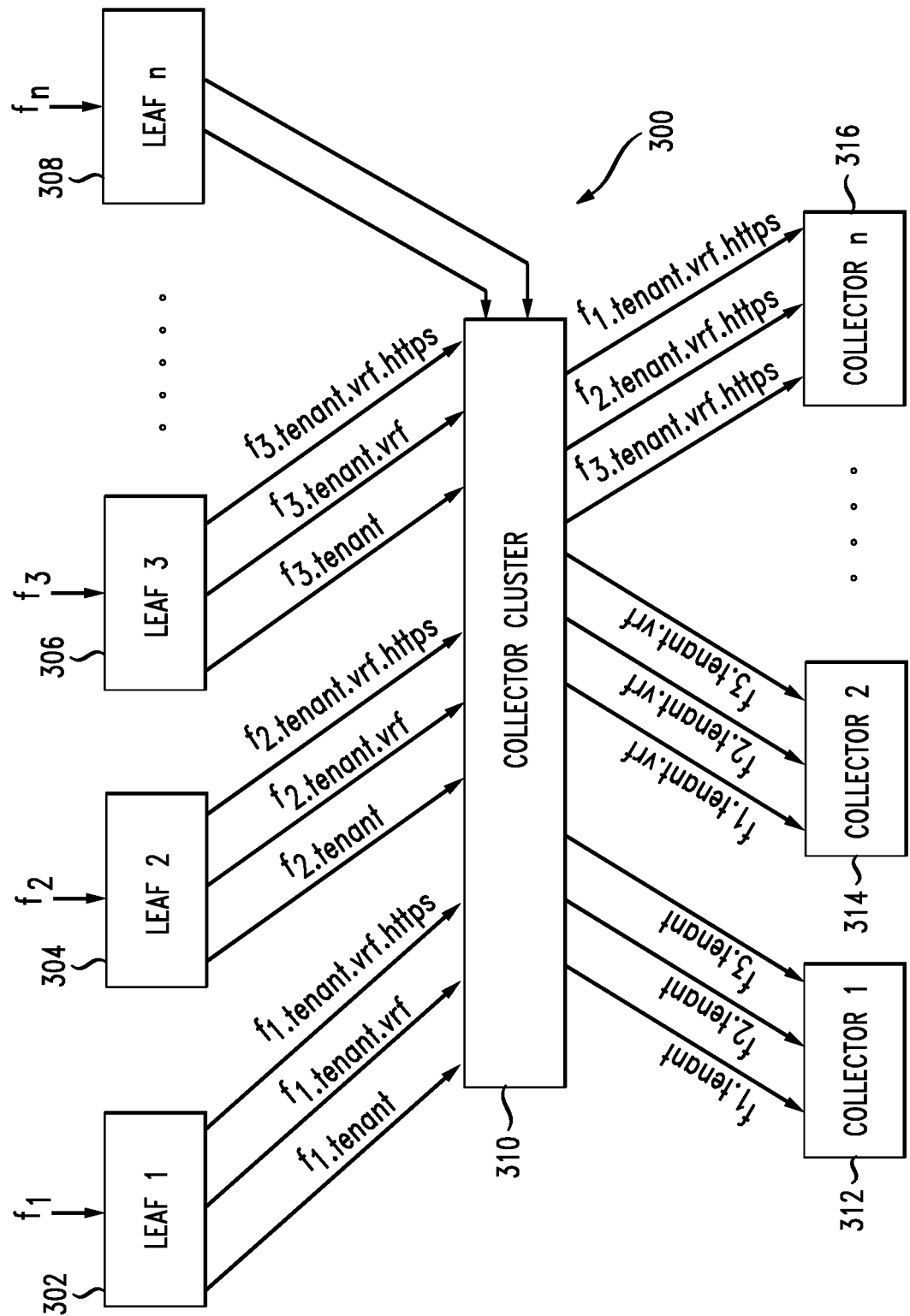
FIG. 3 illustrates a collector cluster and numerous respective collectors connected thereto.

FIG. 3 illustrates a network fabric having a Leaf 1 (302) receiving a flow $f_1$, Leaf 2 (304) receiving a flow $f_2$, Leaf 3 (306) receiving a flow $f_3$ and a Leaf n (308) receiving a flow $f_n$. The flows $f_1$, $f_2$, $f_3$ and $f_n$ each represent the same flow (5-tuple) (or different flows) coming into different switches. For example, the flow could be into the same bridge domain (BD) deployed on n switches.

The features $f_{1.tenant}$, $f_{2.tenant}$, and $f_{3.tenant}$ represent an example of the tenant level sub-flow created for a given tenant, such as $f_{1.tenant:tn-1}$. A tenant is a logical container for application policies that enable an administrator to exercise domain-based access control. The features $f_{1.tenant.vrf}$, $f_{2.tenant.vrf}$, and $f_{3.tenant.vrf}$ each represent an example of the tenant+vrf-level sub-flow created for a given virtual routing and forwarding (VRF) object (or context) which is a tenant network. A VRF is a unique layer 3 forwarding an application policy domain. For example, the VRF can be characterized as tn-1:vrf-1.

The features $f_{1.tenant.vrf.https}$, $f_{2.tenant.vrf.https}$, and $f_{3.tenant.vrf.https}$ each represent the https sub-flow for tn-1:vrf-1. As shown in FIG. 3, each of the 5-tuple data flows into a respective leaf node. A 5-tuple refers to a set of five different values that are a part of a Transmission Control Protocol/Internet Protocol (TCP/IP) connection. It includes a source IP address/port number, destination IP address/port number and the protocol in use. From the packet headers and incoming interface on the switch (Leaf 1, Leaf 2, etc.), each respective switch can derive other virtual attributes like Tenant, VRF, BD, Application, Endpoint Group (EPG) and create finer flows (N Tuples) from the initial 5-tuple flow. Examples of the sub-flows or finer flows are shown as the $f_{1.tenant}$, $f_{1.tenant.vrf}$ and $f_{1.tenant.vrf.https}$ flows from Leaf 1. Other sub-flows can of course be derived as well. Each of these sub/micro flows corresponds to a combination of one or more of the attributes of the 5-tuple along with one or more of the virtual attributes.

Each of the sub-flows is exported to the virtual netflow collector or collector cluster 310, which gets mapped in the network to one or more of the physical netflow collectors 312, 314, 316 in the cluster through consistent hashing of the sub-flow parameters. As is shown in FIG. 3, all of the $f_{x.tenant}$ sub-flows are mapped to collector 1 (312), all of the $f_{x.tenant.vrf}$ sub-flows are mapped to collector 2 (314) and all of the $f_{1.tenant.vrf.https}$ sub-flows are mapped to collector n (316).

A given sub-flow created in one or more switches (302, 304, 306, 308) in the fabric will end up in the same physical instance of the collector cluster to provide a aggregated view. As an example, HTTPS traffic statistics on a given BD which is spread across multiple switches will always end up in the same physical collector instance. Similarly, aggregated traffic stats for a VRF will end in one collector instance.

The same idea applies for any visualization of the collected flows. Since the sub-flow is mapped to a physical collector inside the virtual collector 310, any form of query can be targeted at the virtual collector 310, which then gets internally mapped to the physical collector instance (312, 314, 316) holding the sub-flow. For example, an administrator can query the system for "https traffic for BD b1 in tenant t1" and can automatically be redirected by the network to the collector instance holding the entry, which is collector n (316) in FIG. 3. In one aspect, the network fabric presents one collector view for both collection and visualization.

While the above steps can be applied for any network of switches that are logically managed together, it is particularly significant in the ACI fabric. In the ACI fabric, the netflow collector functionality can be distributed across the spine and leaf switches and the underlay network control and data plane can be leveraged to provide the network function that maps the sub-flow to the physical collector instance. The entire ACI fabric can be envisioned as one netflow monitor and collector domain, which can also provide visualization interface through the REST interface. The REST interface is the Representative State Transfer and it relies on a stateless, client-server, cacheable communications protocol.

The solution disclosed herein makes use of the fabric compute resources like the leaf and spine CPU resources to run collector functionality, instead of mandating external collector nodes. Also, the solution uses the underlay multicast and VxLAN (discussed more fully below) segmentation to map and efficiently deliver the sub-flows to the corresponding collectors residing in the Leaf/Spine switches. This mapping function is done in a deterministic and distributed way without need for synchronization. This helps the leaf and spine switches that form the collector domain to be dynamically rearranged based on the available compute resources to do the functionality. When a leaf leaves the collector domain (or) when a new leaf gets added to the collector domain, the collection functionality in the rest of the fabric is not affected. This provides one of the benefits of the present disclosure, which is the ability to scale or expand easily for new leaf nodes added to a fabric.

Virtual Extensible local area network (VxLAN) is a network virtualization technology that attempts to address the scalability problems associated with large cloud computing deployments. The technology applies a virtual LAN (VLAN) type of encapsulation technique to encapsulate MAC-based OSI layer 2 Ethernet frames within layer 4 UDP (user datagram protocol) packets, using 4789 as the default IANA-assigned destination UDP port number. VxLAN endpoints, which terminate VxLAN tunnels and may be virtual and/or physical switch ports, are known as VxLAN tunnel endpoints (VTEPs).

VxLAN seeks to standardize on an overlay encapsulation protocol. Multicast or unicast with HER (Head-End Replication) is used to flood BUM (broadcast, unknown destination address, multicast) traffic. RFC 7348, which is incorporated herein by reference as background material.

The following are examples of the ACI fabric's virtual constructs: tenant, virtual routing and forwarding (VRF) and bridge domain (BD). Current netflow standards are at a switch-level and hence do not augur well for collection of fabric-wide statistics such as an amount of HTTPS traffic on a given tenant, number of packets originating from IP <A.B.C.D> on a given VRF, number of incoming packets across all interfaces in a given BD or traffic originating from a particular distributed application.

Figure 4:
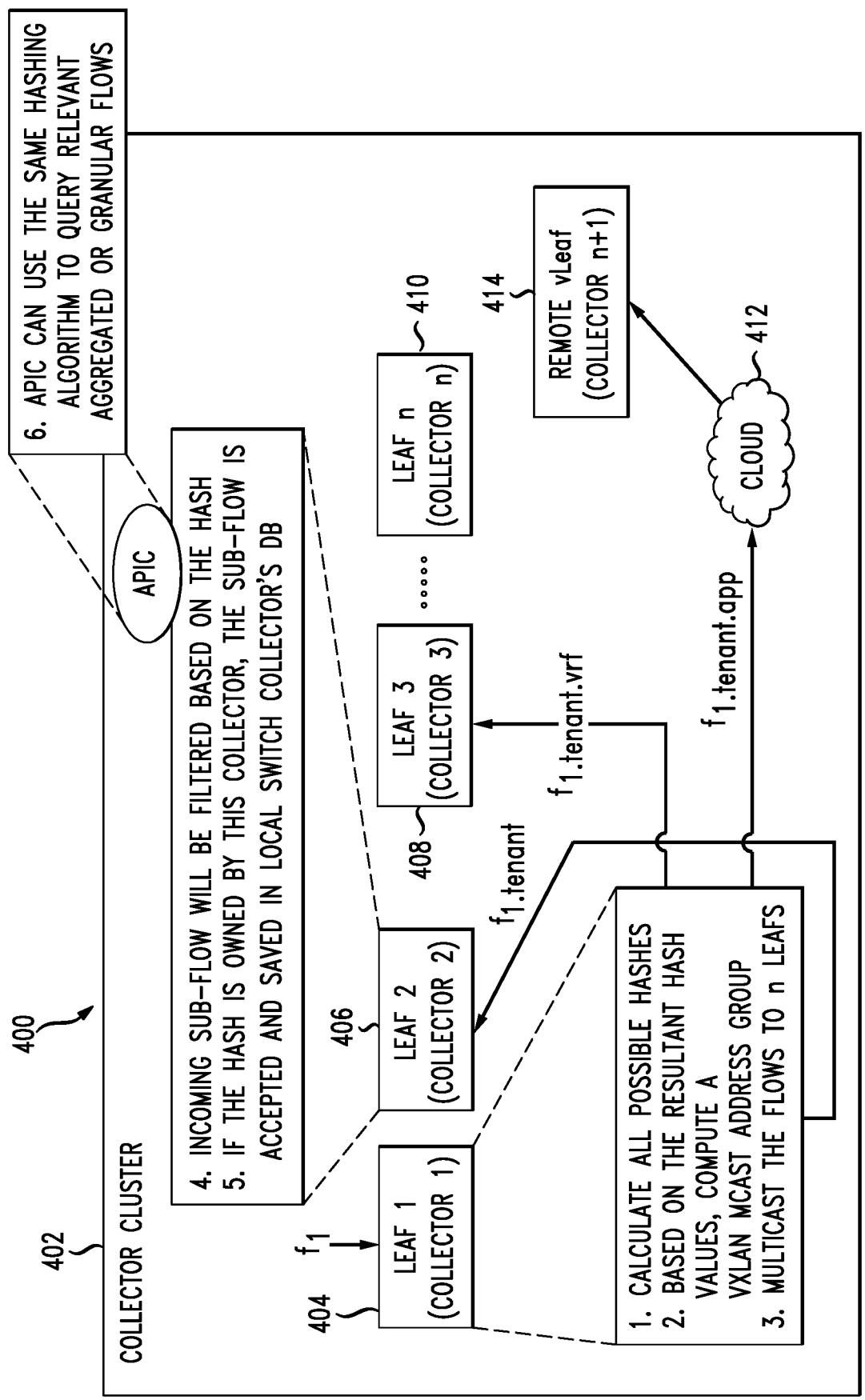
FIG. 4 illustrates further details associated with the collector cluster and the approach disclosed herein.

One example way to achieve a desired level of fabric-wide aggregation is presented with reference to FIG. 4. FIG. 4 shows an example fabric 400 with various components shown to highlight the process disclosed herein. In one aspect, the concept includes distributing netflow packet collection across all switches in the ACI fabric. i.e., the switches in the fabric can each act as individual netflow collectors. In one example, a source switch (Leaf 1, Collector 1 (404)) of the incoming packet will calculate a hash on each possible combination of the 5-tuple IP Packet header, along with the tenant, VRF, application and/or interface information. For example, a hash on combinations of each of {tenant, VRF, application, interface} on one side and {SIP, DIP, SPort, DPort, Protocol} on the other side. An example equation could perform this evaluation can include: $(_{r=1-x}\Sigma^x C_r) \times (_{r=1-5}\Sigma^5 C_r)$.

The above example equation computes 7 different combinations of {tenant, VRF, interface} (for x=3) combined along with 31 different combination of 5-tuple, giving as result of a total of (7×31)=217 possible combinations.

Each of the resultant hash combinations can correspond to one or more target switches (406, 408, 410, 414 through cloud 412) that will act as netflow collectors for that unique hash. Hence, all the above 217 combinations of netflow packet records will be sent to various destination switches using the underlay network. Each subflow is resident on multiple switches for resiliency and for providing scalable queries.

Based on the resultant hash values, the Leaf 1 will compute a VxLAN multicast address group and the Leaf 1 will multicast the flow to n leafs. As is shown in FIG. 3, the $f_{1.tenant}$ subflow is sent to Leaf 2 (Collector 2) 406, $f_{1.tenant.vrf}$ subflow is sent to Leaf 3 (Collector 3) 408, and the $f_{1.tenant.app}$ subflow is sent through the cloud 412 to a remote vleaf (Collector n+1) 414.

Consider the $f_{1.tenant}$ subflow as an example. The incoming sub-flow to Leaf 2 (Collector 2) 406 will be filtered based on the hash. If the hash is owned by the respective collector, the sub-flow is accepted and saved in the local switch collector database. If not, the sub-flow is rejected. An application policy infrastructure controller (APIC) 416 can use the same hashing algorithm to query any relevant aggregated or granular flow.

As noted above, computing the VxLAN multicast address group can be performed by a function that maps the sub-flow hash to an IP Multicast address, VxLAN Segment ID combination in the overlay network. A group of leaf switches which share one or more hashes can be considered to be part of a multicast group. A packet corresponding to a hash will be sent on the corresponding multicast group and reaches all the component switches. If a particular switch owns the hash, as in the Leaf 2 406 discussed above, it accepts the packet and creates the flow record in the collector. If a switch doesn't own the hash, it rejects the packet. VxLAN segment ID is used to convey the hash value. The multicast group or multicast rules can be established or set up based on the all possible calculated hash values or hash combination values.

Note that the hash-to-switch mapping can be done in a distributed fashion in individual switches as it can be computed based on the vector of cluster nodes. Similarly, the hash to multicast group, VxLAN mapping can also be done in a distributed fashion. A switch can automatically join/leave a multicast group based on the hash ownership. In the incoming switch, the packet can be automatically mapped to the multicast group likewise. The above approach makes dynamic addition and deletion of collection nodes automatic and simple. The approach can be particularly useful in a cloud setting, when the collection service is treated as a workload which can be migrated to any node based on the immediate availability of the compute resource. In an ACI fabric distributed across several physical and virtual PODs (a grouping of one or more application images, with additional metadata applied to the POD as a whole), the system could use an orchestrator to place the physical collector instance in any available node. When a new node is added and the hash vector computed, the new node can automatically become part of the collection domain.

The target switch, say Leaf 2 (406), on receipt of the netflow packet will save the information in the switch's local database, thereby truly achieving distributed netflow collection.

The collected data can now be queried using the same formula by an administrator, where the query for a particular combination can be distributed to different switches based on the same hash calculation, and then aggregated at the APIC controller 416 level. For example, a query on {tenant A, Protocol X} will correspond to a unique hash, whose results can be queried from the corresponding switch acting as a collector for that combination. The query, in other words, can use the same hashing mechanism used in association with the multicast rules to enable the query to pull the desired data from the fabric.

The end result is that the approach disclosed herein achieves scalable, distributed netflow along with adding the capability to provide fabric-level netflow statistics even on virtual constructs like tenant, VRF etc.

Advantages of the disclosed approach include allowing the system to analyze statistics at a fabric-level (as opposed to individual switch-level) as well as enabling the distribution of netflow record collection across the entire fabric, thereby removing a single point of failure, and also enabling us to make distributed queries and data-aggregation. The concept can be extended to the cloud where an Application Virtual Switch (AVS) residing in the cloud can potentially use the ACI fabric as a distributed netflow collector for the stats that the AVS collects. Conversely, the AVS switch itself could act as one of the distributed collectors across the cloud, thereby taking netflow beyond traditional data-center boundaries.

The disclosed idea provides granular statistics in a distributed fashion, which are otherwise difficult to sustain with static collector configuration. The idea also proposes newer netflow statistics which are more application centric and makes use of ACI constructs. The idea makes use of ACI Leaf and Spine resources for providing collector functionality and uses the fabric multicast service to efficiently deliver the information to the collector. Use of the concept is easily detectible as the solution of fabric wide netflow with a virtual collector needs to be a documented functionality with specific user configuration and guideline. Also, the use of the idea can be viewed by observing the netflow packets on the wire which carry the VxLAN Header and terminating in the Fabric Leaf switches. Collectors can be different leafs in the fabric 400 or can be any other component or node within the fabric.

Figure 5:
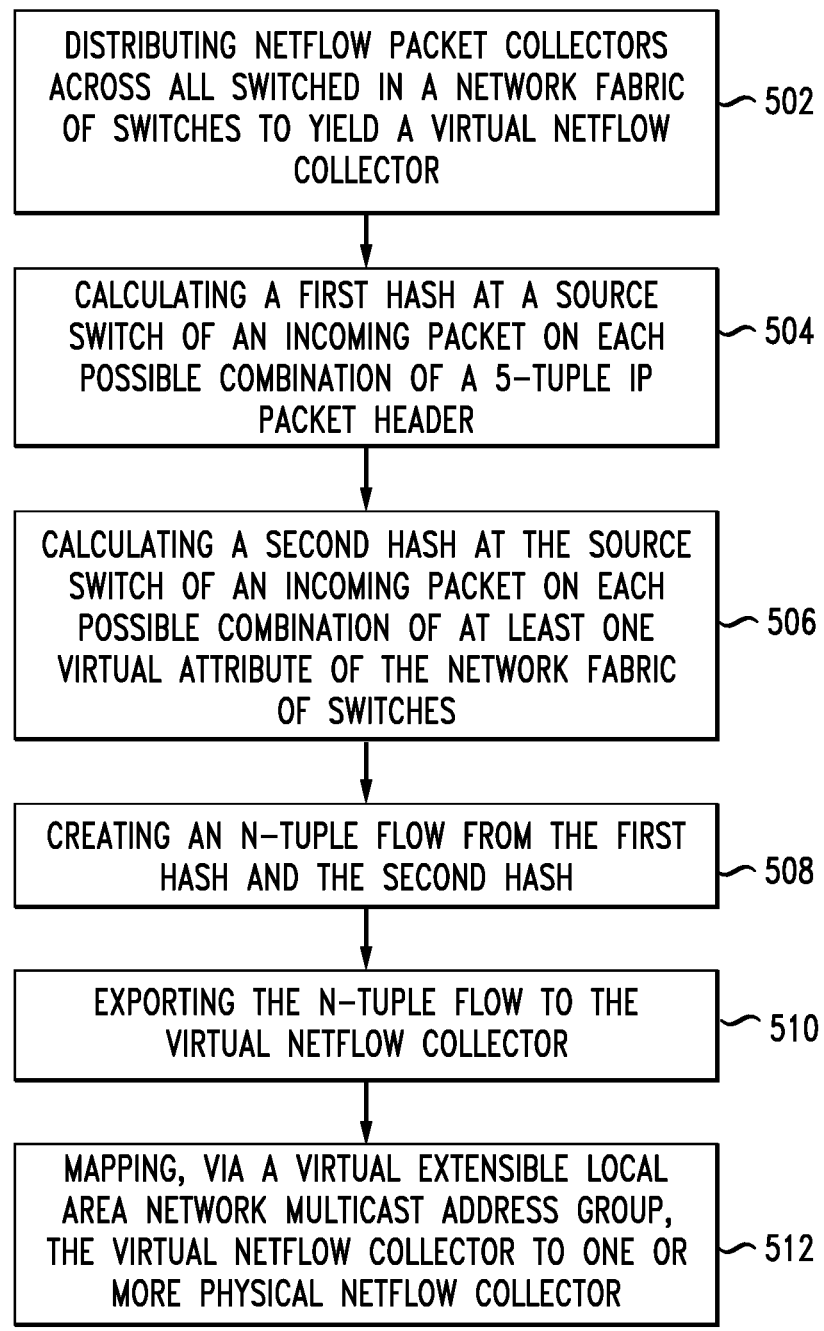
FIG. 5 illustrates a method embodiment.

FIG. 5 illustrates a method embodiment of this disclosure. A method includes distributing netflow packet collectors across all switched in a network fabric of switches to yield a virtual netflow collector (502), calculating a first hash at a source switch of an incoming packet on each possible combination of a 5-tuple IP packet header (504), calculating a second hash at the source switch of an incoming packet on each possible combination of at least one virtual attribute of the network fabric of switches (506) and creating an N-Tuple flow from the first hash and the second hash (508).

The method further includes exporting the N-Tuple flow to the virtual netflow collector (510) and mapping, via a virtual extensible local area network multicast address group, the virtual netflow collector to one or more physical netflow collector (512).

In one aspect, each switch in the network fabric of switches can act as a respective netflow collector. The method can further include receiving a query at the virtual netflow collector regarding the N-Tuple flow (514) and presenting a response to the query based on the mapping of the virtual netflow collector to the one or more physical netflow collector (516). The response can include a visualization response. The query can utilize at least one of the first hash and the second hash or a combined hash to basically use the same hashing algorithm to query as was used to process the flow in the first instance.

The method can include aggregating statistics for a given virtual attribute to end up in a same physical collector instance according to the mapping of the virtual netflow collector to the one or more physical netflow collector. At least one virtual attribute can include one or more of a tenant, a virtual routing and forwarding object, an endpoint group, a bridge domain, a subnet, a contract, an application, and a filter.

Figure 6:
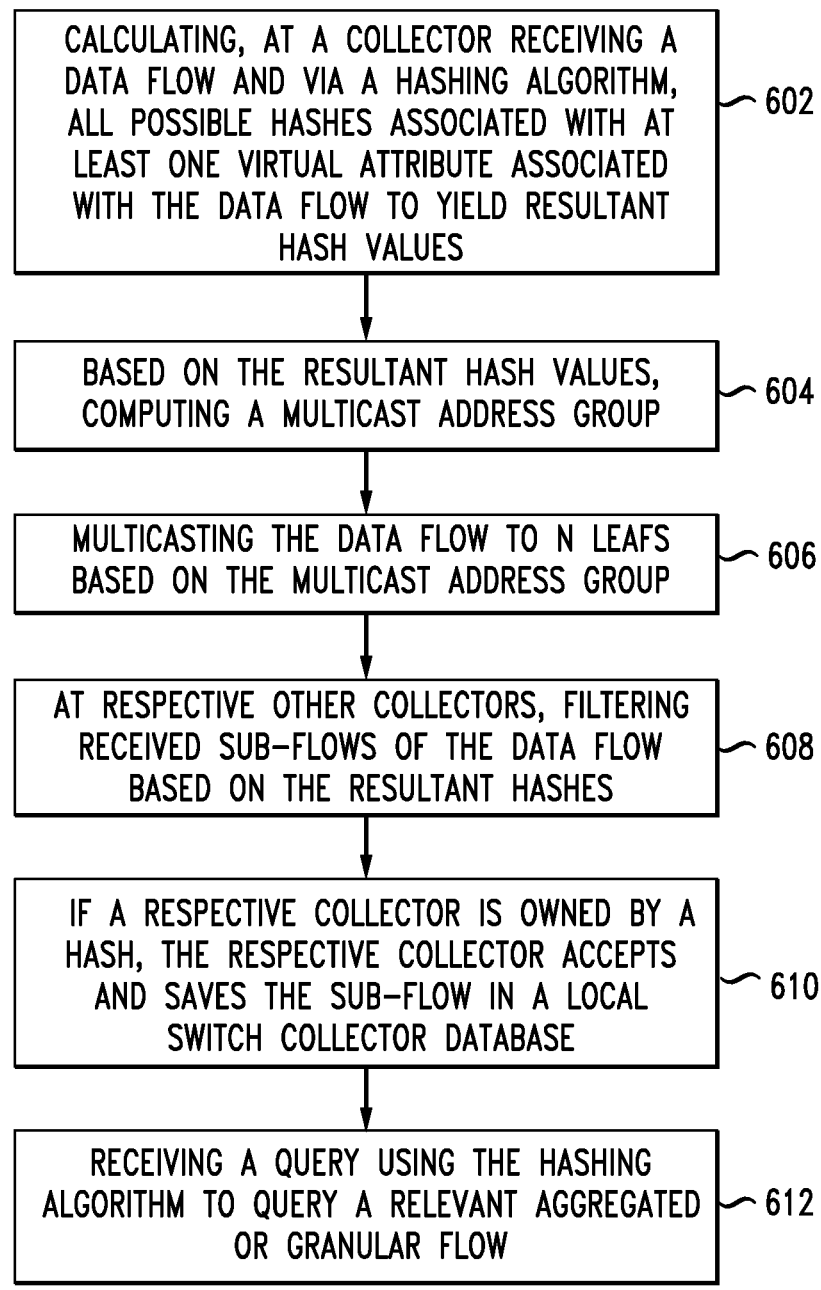
FIG. 6 illustrates another method embodiment.

FIG. 6 illustrates another method embodiment. As shown in FIG. 6, a method includes calculating, at a collector receiving a data flow and via a hashing algorithm, all possible hashes associated with at least one virtual attribute associated with the data flow to yield resultant hash values (602), and based on the resultant hash values, computing a multicast address group (604) and multicasting the data flow to n leafs based on the multicast address group (606). The method includes, at respective other collectors, filtering received sub-flows of the data flow based on the resultant hashes (608) wherein if a respective collector is owned by a hash, the respective collector accepts and saves the sub-flow in a local switch collector database (610). The method also includes receiving a query using the hashing algorithm to query a relevant aggregated or granular flow (612). The system will respond by distributing the query to different switches based on the hash algorithm such that the user can receive fabric-level network statistics even on subflows based on a virtual construct like tenant, VRF, etc.

In some embodiments the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other. For example, while some specific protocols such as 802.11 and 802.3 are mentioned in the examples above, the principles could apply to any communication protocol and does not have to be limited to these particular protocols. Any configuration in which received data is acknowledged through an ACK signal could implement the concepts disclosed herein.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method for creating a virtual netflow collector to distribute netflow packet collections across switches in a network, the method comprising:
   distributing netflow packet collectors across all switches in a network fabric of switches to yield a virtual netflow collector, the netflow packet collectors configured to collect data from one or more capturing agents;
   calculating a first hash at a source switch of an incoming packet on each possible combination of a 5-tuple IP packet header;
   calculating a second hash at the source switch of the incoming packet on each possible combination of at least one virtual attribute of the network fabric of switches;
   creating an N-Tuple flow from the first hash and the second hash;
   exporting the N-Tuple flow to the virtual netflow collector;
   mapping, via a virtual extensible local area network multicast address group, the virtual netflow collector to one or more physical netflow collectors; and
   providing a visualization response, in response to a query regarding the N-Tuple flow at the virtual netflow collector.

2. The method of claim 1, wherein each of the switches is configured to function as a netflow collector.

3. The method of claim 1, further comprising:
   receiving a query at the virtual netflow collector regarding the N-Tuple flow; and
   presenting a response to the query based on the mapping of the virtual netflow collector to the one or more physical netflow collectors.

4. The method of claim 3, wherein the response comprises a visualization response.

5. The method of claim 3, wherein the query uses at least one of the first hash and the second hash.

6. The method of claim 1, wherein aggregated statistics for a given virtual attribute end up in a same physical collector instance according to the mapping of the virtual netflow collector to the one or more physical netflow collectors.

7. The method of claim 1, wherein the at least one virtual attribute comprises one or more of a tenant, a virtual routing and forwarding object, an endpoint group, a bridge domain, a subnet, a contract, an application, or a filter.

8. A system for creating a virtual netflow collector to distribute netflow packet collections across switches in a network, the system comprising:
   at least one processor; and
   a computer-readable storage device storing instructions which, when executed by the at least one processor, cause the at least one processor to perform operations comprising:
      distributing netflow packet collectors across all switches in a network fabric of switches to yield a virtual netflow collector, the netflow packet collectors configured to collect data from one or more capturing agents;
      calculating a first hash at a source switch of an incoming packet on each possible combination of a 5-tuple IP packet header;
      calculating a second hash at the source switch of the incoming packet on each possible combination of at least one virtual attribute of the network fabric of switches;
      creating an N-Tuple flow from the first hash and the second hash;
      exporting the N-Tuple flow to the virtual netflow collector;
      mapping, via a virtual extensible local area network multicast address group, the virtual netflow collector to one or more physical netflow collectors; and
      providing a visualization response, in response to a query regarding the N-Tuple flow at the virtual netflow collector.

9. The system of claim 8, wherein each of the switches is configured to function as a netflow collector.

10. The system of claim 8, wherein the computer-readable storage device stores additional instructions which, when executed by the at least one processor, cause the at least one processor to perform operations further comprising:
    receiving a query at the virtual netflow collector regarding the N-Tuple flow; and
    presenting a response to the query based on the mapping of the virtual netflow collector to the one or more physical netflow collectors.

11. The system of claim 10, wherein the response comprises a visualization response.

12. The system of claim 10, wherein the query uses at least one of the first hash and the second hash.

13. The system of claim 8, wherein aggregated statistics for a given virtual attribute end up in a same physical collector instance according to the mapping of the virtual netflow collector to the one or more physical netflow collectors.

14. The system of claim 8, wherein the at least one virtual attribute comprises one or more of a tenant, a virtual routing and forwarding object, an endpoint group, a bridge domain, a subnet, a contract, an application, or a filter.

15. A non-transitory computer readable medium, for creating a virtual netflow collector to distribute netflow packet collections across switches in a network, storing instructions which, when executed by at least one processor, causes the at least one processor to perform operations comprising:
    distributing netflow packet collectors across all switches in a network fabric of switches to yield a virtual netflow collector, the netflow packet collectors configured to collect data from one or more capturing agents;
    calculating a first hash at a source switch of an incoming packet on each possible combination of a 5-tuple IP packet header;
    calculating a second hash at the source switch of the incoming packet on each possible combination of at least one virtual attribute of the network fabric of switches;
    creating an N-Tuple flow from the first hash and the second hash;
    exporting the N-Tuple flow to the virtual netflow collector;
    mapping, via a virtual extensible local area network multicast address group, the virtual netflow collector to one or more physical netflow collectors; and providing a visualization response, in response to a query regarding the N-Tuple flow at the virtual netflow collector.

16. The non-transitory computer readable medium of claim 15, wherein each of the switches is configured to function as a netflow collector.

17. The non-transitory computer readable medium of claim 15, storing additional instructions which, when executed by the at least one processor, cause the at least one processor to perform operations further comprising:
receiving a query at the virtual netflow collector regarding the N-Tuple flow; and
presenting a response to the query based on the mapping of the virtual netflow collector to the one or more physical netflow collectors.

18. The non-transitory computer readable medium 17, wherein the response comprises a visualization response.

19. The non-transitory computer readable medium 17, wherein the query uses at least one of the first hash and the second hash.

20. The non-transitory computer readable medium of claim 15, wherein aggregated statistics for a given virtual attribute end up in a same physical collector instance according to the mapping of the virtual netflow collector to the one or more physical netflow collectors.

\* \* \* \* \*